US 7,768,769 B2

(12) United States Patent
Matsui et al.

(10) Patent No.: US 7,768,769 B2
(45) Date of Patent: Aug. 3, 2010

(54) LITHIUM ION CAPACITOR

(75) Inventors: Kohei Matsui, Shinjuku-ku (JP); Risa Takahata, Shinjuku-ku (JP); Nobuo Ando, Shinjuku-ku (JP); Atsuro Shirakami, Shinjuku-ku (JP); Shinichi Tasaki, Shinjuku-ku (JP); Yukinori Hato, Shinjuku-ku (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1141 days.

(21) Appl. No.: 10/576,363

(22) PCT Filed: Oct. 28, 2005

(86) PCT No.: PCT/JP2005/019908
§ 371 (c)(1),
(2), (4) Date: Apr. 19, 2006

(87) PCT Pub. No.: WO2006/112070
PCT Pub. Date: Oct. 26, 2006

(65) Prior Publication Data
US 2009/0174986 A1    Jul. 9, 2009

(30) Foreign Application Priority Data
Mar. 31, 2005  (JP) .............................. 2005-104727

(51) Int. Cl.
*H01G 9/00* (2006.01)
*H01G 9/02* (2006.01)
(52) U.S. Cl. ....................................... 361/502; 361/504
(58) Field of Classification Search .......... 361/502–505
See application file for complete search history.

(56) References Cited

U.S. PATENT DOCUMENTS

| 6,461,769 B1 | 10/2002 | Ando et al. |
| 6,862,168 B2 | 3/2005 | Ando et al. |
| 2002/0028389 A1* | 3/2002 | Sonoda et al. .............. 429/324 |

FOREIGN PATENT DOCUMENTS

DE    195 48 005 A1    7/1996

(Continued)

OTHER PUBLICATIONS

U.S. Appl. No. 10/584,858, filed Jun. 28, 2006, Tasaki et al.
U.S. Appl. No. 10/576,489, filed Apr. 20, 2006, Tasaki et al.

*Primary Examiner*—Eric Thomas
(74) *Attorney, Agent, or Firm*—Oblon, Spivak, McClelland, Maier & Neustadt, L.L.P.

(57) ABSTRACT

A lithium ion capacitor having a high capacity retention at the time of continuous charge at a high temperature and excellent durability. The lithium ion capacitor includes a positive electrode, a negative electrode and an aprotic organic solvent electrolyte solution of a lithium salt as an electrolytic solution. The positive electrode active material is a material capable of reversibly supporting lithium ions and/or anions, a negative electrode active material is a material capable of reversibly supporting lithium ions, the negative electrode and/or the positive electrode is doped with lithium ions so that the potential of the positive electrode is at most 2.0 V after the positive electrode and the negative electrode are short-circuited, and the electrolytic solution contains vinylene carbonate or its derivative.

15 Claims, 1 Drawing Sheet

FOREIGN PATENT DOCUMENTS

| | | |
|---|---|---|
| EP | 1 022 797 A1 | 7/2000 |
| EP | 1 239 495 A1 | 9/2002 |
| EP | 1 400 996 A1 | 3/2004 |
| JP | 11-297578 | 10/1999 |
| JP | 2001-167797 | 6/2001 |
| JP | 2004-111349 | 4/2004 |
| JP | 2004-221425 | 8/2004 |
| WO | 03-003395 | 1/2003 |

* cited by examiner

LITHIUM ION CAPACITOR

TECHNICAL FIELD

The present invention relates to a lithium ion capacitor comprising a positive electrode, a negative electrode and an aprotic organic solvent electrolytic solution of a lithium salt as an electrolyte.

BACKGROUND ART

In recent years, a so-called lithium ion secondary battery using as a negative electrode a carbon material such as graphite and using as a positive electrode a lithium-containing metal oxide such as $LiCoO_2$, which has a large capacity and is expected as a promising electrical storage device, has been used practically as the main power source for notebook computers and mobile phones. The lithium ion secondary battery is a so-called rocking chair battery such that after it is assembled, lithium ions are supplied from the lithium-containing metal oxide as the positive electrode to the negative electrode by charging the battery, and the lithium ions in the negative electrode are returned to the positive electrode by discharging the battery, and is characterized by having a high voltage, a large capacity and high safety.

Further, as concern for environmental problems is increasing, electrical storage devices (main power source and auxiliary power source) for electronic automobiles and hybrid electronic automobiles which replace gasoline-powered vehicles, have been actively developed, and lead batteries have been used as an electrical storage device for automobiles. However, due to enhancement of on-vehicle electric apparatus and devices, a new electrical storage device has been required in view of the energy density and the output density.

As such a new electrical storage device, attention has been paid to the above lithium ion secondary battery and an electric double layer capacitor. However, although a lithium ion secondary battery has a high energy density, it still has problems in output characteristics, safety and cycle life. On the other hand, an electric double layer capacitor has been used as a memory backup power source for IC or LSI, but the discharge capacity per charge is small as compared with a battery. However, it is maintenance-free and has high output characteristics which the lithium ion secondary battery does not have, such as excellent instantaneous charge and discharge characteristics and durability against charge and discharge for several tens of thousands cycles or more.

Although an electric double layer capacitor has such advantages, an energy density of a conventional electric double layer capacitor usually ranges from about 3 to about 4 Wh/l, which is lower than by two orders than that of a lithium ion secondary battery. In the case of an electrical storage device for electronic automobiles, an energy density of from 6 to 10 Wh/l is required for practical use and an energy density of 20 Wh/l for wide spread use.

As an electrical storage device to be used for such an application which requires a high energy density and high output-characteristics, attention has been paid to an electrical storage device also called a hybrid capacitor comprising a combination of storage principles of a lithium ion secondary battery and an electric double layer capacitor in recent years. A hybrid capacitor usually employs a polarized electrode for the positive electrode and a non-polarized electrode for the negative electrode, and attracts attention as an electrical storage device having both high energy density of a battery and high output characteristics of an electric double layer capacitor. Further, a hybrid capacitor has been proposed (Patent Documents 1 to 4) in which a negative electrode capable of absorbing and desorbing lithium ions is brought into contact with lithium metal so that lithium ions are preliminarily made to be absorbed and supported (hereinafter sometimes referred to as doping) by the negative electrode by a chemical or electrochemical method to lower the negative electrode potential, thereby to increase the withstand voltage and to significantly increase the energy density.

Such a hybrid capacitor is expected to shoe high performance, but has drawbacks such that when the negative electrode is doped with lithium ions, the doping requires a very long time, and it tends to be difficult to uniformly dope the entire negative electrode. Particularly, the doping is practically impossible to be carried out a large-size large capacity cell such as a cylindrical apparatus having electrodes wound or a rectangular battery having a plurality of electrodes laminated.

However, this problem has been dissolved all at once by an invention (Patent Document 5) such that the entire negative electrodes in the cell can be doped with lithium ions only by disposing lithium metal at the end of the cell, by forming pores penetrating from the front surface to the back surface on each of a negative electrode current collector and a positive electrode current collector so that lithium ions can move via the through pores, and further, by short circuiting the lithium metal as a lithium ion supply source and the negative electrode. Usually doping with lithium ions is carried out on the negative electrode, but Patent Document 5 discloses to conduct similarly the doping on the positive electrode together with the negative electrode or instead of the negative electrode.

Thus, there appears the prospect of the realization of such a capacitor that the entire negative electrodes in an apparatus can be uniformly doped with lithium ions in a short time even in a large-size cell such as a cylindrical apparatus having electrodes wound or a rectangular battery having a plurality of electrodes laminated, whereby the energy density with an improved withstand voltage will be drastically increased, and a large capacity will be achieved in combination with a high output density which an electric double layer capacitor inherently has.

However, in order to realize such a large capacity capacitor, a larger capacity, a higher energy density and a higher output density, and securement of higher durability are required.

Patent Document 1: JP-A-8-107048
Patent Document 2: JP-A-9-55342
Patent Document 3: JP-A-9-232190
Patent Document 4: JP-A-11-297578
Patent Document 5: WO98/033227

DISCLOSURE OF THE INVENTION

Problems that the Invention is to Solve

It is an object of the present invention to provide a lithium ion capacitor having a high capacity retention during continuous charging at a high temperature and excellent in durability, which is of a system wherein a positive electrode active material is a material capable of reversibly supporting lithium ions and/or anions, a negative electrode active material is a material capable of reversibly supporting lithium ions, and the negative electrode and/or the positive electrode is preliminarily doped with lithium ions by electrochemical contact of the negative electrode and/or the positive electrode with lithium metal as a lithium supply source.

Means of Solving the Problems

To achieve the above object, the present inventors have conducted extensive studies and as a result, found the following. Namely, in a lithium ion capacitor wherein a negative electrode and/or a positive electrode is preliminarily doped with lithium ions so that the potentials of the positive electrode and the negative electrode are at most 2.0 V after the positive electrode and the negative electrode are short-circuited, physical properties of an aprotic organic solvent electrolyte solution of a lithium salt to be used closely relate to durability of the obtained capacitor, and the above object can be achieved by incorporating vinylene carbonate or its derivative in the electrolytic solution preferably in an amount of at most 5 wt %. The present invention has been accomplished on the basis of this discovery.

Namely, the present invention provides the following.

(1) A lithium ion capacitor comprising a positive electrode, a negative electrode and an aprotic organic solvent electrolyte solution of a lithium salt as an electrolytic solution, characterized in that a positive electrode active material is a material capable of reversibly supporting lithium ions and/or anions, a negative electrode active material is a material capable of reversibly supporting lithium ions, the negative electrode and/or the positive electrode are doped with lithium ions so that the potential of the positive electrode is at most 2.0 V after the positive electrode and the negative electrode are short-circuited, and the electrolytic solution contains vinylene carbonate or its derivatives.

(2) The lithium ion capacitor according to the above (1), wherein the positive electrode and/or the negative electrode have a current collector having pores penetrating from the front surface to the back surface, and are doped with lithium ions by electrochemical contact of the negative electrode with a lithium ion supply source.

(3) The lithium ion capacitor according to the above (1) or (2), wherein the negative electrode active material has a capacitance per unit weight at least three times that of the positive electrode active material, and the weight of the positive electrode active material is larger than the weight of the negative electrode active material.

(4) The lithium ion capacitor according to any one of the above (1) to (3), wherein the electrolytic solution contains vinylene carbonate or its derivative in an amount of at most 5 wt %.

(5) The lithium ion capacitor according to any one of the above (1) to (4), wherein the aprotic organic solvent is a mixture of a cyclic carbonate with a chain carbonate.

(6) The lithium ion capacitor according to any one of the above (1) to (5), wherein the aprotic organic solvent is a mixture of ethylene carbonate, propylene carbonate and diethyl carbonate.

(7) The lithium ion capacitor according to any one of the above (1) to (6), wherein the lithium salt is $LiPF_6$, $LiN(C_2F_5SO_2)_2$ or $LiN(CF_3SO_2)_2$.

Effects of the Invention

According to the present invention, a particularly large capacity lithium ion capacitor wherein a negative electrode and/or a positive electrode is preliminarily doped with lithium ions, which has a high energy density and a high output density and further has a high capacity retention during continuous charging at a high temperature and is excellent in durability, is provided. In the present invention, the mechanism how a capacitor has a high energy density and a high output density and further has an improved capacity retention during continuous charging at a high temperature, by incorporating vinylene carbonate or its derivative in the above electrolytic solution, is not necessarily clearly understood but is estimated as follows. Vinylene carbonate or its derivative has a high reductive decomposition potential and dominates the reductive decomposition on the negative electrode and forms a stable and high quality surface coating film, and thereby suppresses decomposition of other solvents. In a usual lithium ion secondary battery and the like, vinylene carbonate or its derivative undergoes reductive decomposition to form a coating film on the negative electrode in the initial charging, but since vinylene carbonate or its derivative has a low oxidation potential, oxidative decomposition on the positive electrode occurs simultaneously, thus causing a problem such as evolution of gas. On the other hand, in the present invention, in a case where the negative electrode and/or the positive electrode is preliminarily doped with lithium ions, the positive electrode potential will not increase during the doping, but only the negative electrode potential decreases, whereby no oxidative decomposition of vinylene carbonate or its derivative on the positive electrode will occur. As a result, only formation of a coating film by the reductive decomposition on the negative electrode will occur without any problem such as evolution of gas.

EXPLANATION OF SYMBOLS

Figure 1:
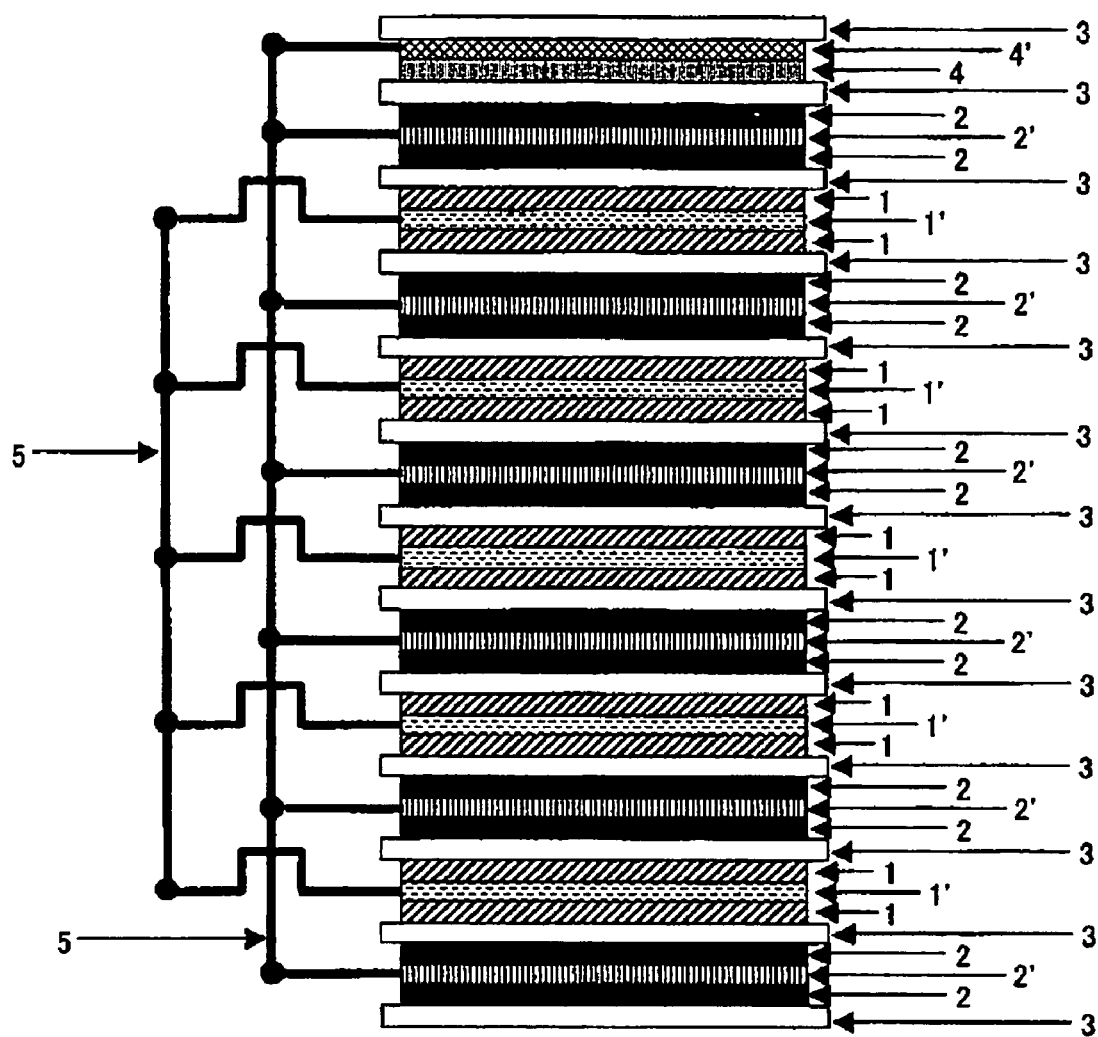
FIG. 1 is a schematic view illustrating the structure of a lithium ion capacitor used in Example 1.

1: positive electrode, 1': current collector (positive electrode), 2: negative electrode, 2': current collector (negative electrode), 3: separator, 4: lithium metal, 4': current collector (lithium metal), 5: conducting wire

BEST MODE FOR CARRYING OUT THE INVENTION

The lithium ion capacitor of the present invention comprises a positive electrode, a negative electrode and an aprotic organic electrolytic solution of a lithium salt as an electrolytic solution, wherein a positive electrode active material is a material capable of reversively supporting lithium ions and/or anions, and a negative electrode active material is a material capable of reversively supporting lithium ions. The "positive electrode" means an electrode on the side where a current flows out at the time of discharge, and the "negative electrode" means an electrode on the side where a current flows in at the time of discharge.

It is required of the lithium ion capacitor of the present invention that the potential of the positive electrode is at most 2.0 V after the positive electrode and the negative electrode are short-circuited by doping of the negative electrode and/or the positive electrode with lithium ions. In a capacitor wherein the negative electrode and/or the positive electrode is not doped with lithium ions, the potentials of the positive electrode and the negative electrode are both 3 V, and the potential of the positive electrode is 3 V after the positive electrode and the negative electrode are short-circuited.

In the present invention, the potential of the positive electrode being at most 2.0 V after the positive electrode and the negative electrode are short-circuited, means a potential of the positive electrode of at most 2.0 V as obtained by either of the following two methods (A) and (B). That is, (A) after doping with lithium ions, a positive electrode terminal and a negative electrode terminal of a capacitor cell are directly connected by a conducting wire and the capacitor is left to stand for at least 12 hours in such a state, and then the short circuit is released, and the positive electrode potential is measured within from 0.5 to 1.5 hours, (B) after discharging to 0 V at a constant current over a period of at least 12 hours by a charge and discharge testing apparatus, a positive electrode terminal and a negative electrode terminal are connected by a conducting wire and the capacitor is left to stand for at least 12 hours in such a state, and then the short circuit is released, and the positive electrode potential is measured within from 0.5 to 1.5 hours.

Further, in the present invention, the positive electrode potential being at most 2.0 V after the positive electrode and the negative electrode are short-circuited is not limited only to the potential immediately after doping with lithium ions, but means a positive electrode potential of at most 2.0 V after short circuit in any state, i.e. short circuit in a charged state, in a discharged state or after repeated charging and discharging.

In the present invention, the positive electrode potential being at most 2.0 V after the positive electrode and the negative electrode are short-circuited, will be described in detail below. As described above, an activated carbon and a carbon material usually have a potential at a level of 3 V (Li/Li$^+$). In a case where an activated carbon is used for both the positive electrode and the negative electrode to assemble a cell, since both potentials are about 3 V, the positive electrode potential will be unchanged and about 3 V even when the electrodes are short-circuited. Further, also in the case of a hybrid capacitor using an activated carbon for the positive electrode and using for the negative electrode a carbon material such as graphite or hardly graphitizable carbon to be used for a lithium ion secondary battery, since both the potentials are about 3 V, the positive electrode potential will be unchanged and about 3 V even when the electrodes are short-circuited. The negative electrode potential will move to the vicinity of 0 V by charge although it depends on the balance of positive electrode and negative electrode weights, and it is thereby possible to increase the charging voltage, whereby a capacitor having a high voltage and a high energy density will be obtained. In general, the upper limit of the charging voltage is determined to be a voltage at which no decomposition of the electrolytic solution by an increase of the positive electrode potential will occur. Thus, when the positive electrode potential is at the upper limit, it is possible to increase the charging voltage correspondingly to a decrease of the negative electrode potential. However, in the above-described hybrid capacitor of which the positive electrode potential is about 3 V at the time of short circuit, if the upper limit potential of the positive electrode is 4.0 V for example, the positive electrode potential at the time of discharge is limited to 3.0 V, and the change in the potential of the positive electrode is at 1.0 V and the capacity of the positive electrode can not sufficiently be utilized. Further, it has been known that when lithium ions are inserted into (charge) and released from (discharge) the negative electrode, the initial charge and discharge efficiency is low in many cases, and some lithium ions can not be released at the time of discharging. This is explained to be because the lithium ions are consumed for decomposition of the electrolytic solution at the surface of the negative electrode or they are trapped in structural defective portions of the carbon material. In such a case, the charge and discharge efficiency of the negative electrode tends to be low as compared with the charge and discharge efficiency of the positive electrode, and thus the positive electrode potential will be higher than 3 V when the cell is short-circuited after charging and discharging are repeatedly carried out, and the utilization of the capacity will further decrease. That is, if the positive electrode is discharged only from 4.0 V to 3.0 V even if it is possible to be discharged from 4.0 V to 2.0 V, only half the capacity is utilized, and the capacitor can not have a large capacity although it may have a high voltage.

In order to achieve not only a high voltage and a high energy density but also a large capacity and further a high energy density of a hybrid capacitor, it is required to improve the utilization of the positive electrode capacity.

That is, when the positive electrode potential after the short circuit is lower than 3.0 V, the utilization of the capacity will increase correspondingly, and a large capacity will be achieved. In order that the positive electrode potential will be at most 2.0 V, it is preferred to charge the negative electrode with lithium ions not only in an amount of lithium ions to be supplied by the charge and discharge of the cell but also separately from a lithium ion supply source such as lithium metal. As the lithium ions are supplied other than from the positive electrode and the negative electrode, potentials of the positive electrode, the negative electrode and lithium metal are in equilibrium and at most 3.0 V when the positive and negative electrodes are shortcircuited. The larger the amount of lithium metal, the lower the equilibrium potential. As the equilibrium potential changes depending upon the negative electrode material and the positive electrode material, it is required to adjust the amount of lithium ions to be supported by the negative electrode considering characteristics of the negative electrode material and the positive electrode material so that the positive electrode potential after short circuit will be at most 2.0 V.

In the present invention, by preliminarily doping the negative electrode and/or the positive electrode with lithium ions in the capacitor cell, so that the potential of the positive electrode is at most 2.0 V after the positive electrode and the negative electrode are short-circuited, the utilized capacity of the positive electrode will be high, whereby a high capacity will be achieved, and a high energy density will be obtained. The larger the amount of lithium ions supplied, the lower the positive electrode potential after the positive electrode and the negative electrode are short-circuited and the more the energy density will improve. In order to obtain a further higher energy density, at most 1.5 V is preferred, and particularly at most 1.0 V is more preferred. If the amount of lithium ions supplied to the positive electrode and/or the negative electrode is small, the positive electrode potential will be higher than 2.0 V when the positive electrode and the negative electrode are short-circuited, and the energy density of the cell tends to be low. Further, if the positive electrode potential after short circuit is less than 1.0 V, drawbacks such as evolution of gas or irreversible consumption of lithium ions may occur depending upon the positive electrode active material, and it tends to be difficult to measure the positive electrode potential. Further, a too low positive electrode potential means an excessive weight of the negative electrode, and the energy density will rather decrease. It is usually at least 0.1 V, preferably at least 0.3 V.

In the present invention, one of or both the negative electrode and the positive electrode may be doped with lithium ions. However, in a case where an activated carbon is used for the positive electrode for example, if the amount of lithium ions doped is large and the positive electrode potential is low, lithium ions may be irreversibly consumed, and drawbacks such as a decrease in the capacity of the cell may occur in some cases. Thus, it is preferred to adjust doping of the negative electrode and the positive electrode with lithium ions considering active materials for the respective electrodes so that there will be no drawbacks. In the present invention, doping with lithium ions is conducted preferably on the negative electrode since it makes the process complicated to control the amount of doping the positive electrode and the amount of doping the negative electrode.

With respect to the lithium ion capacitor of the present invention, a high voltage and large capacity capacitor will be obtained particularly when the capacitance per unit weight of the negative electrode active material is at least three times the capacitance per unit weight of the positive electrode active material and when the weight of the positive electrode active material is larger than the weight of the negative electrode active material. Further, in addition to the above, when a negative electrode having a large capacitance per unit weight relative to the capacitance per unit weight of the positive electrode is used, it becomes possible to reduce the negative electrode active material weight without changing the change in potential of the negative electrode, whereby the amount of the positive electrode active material charged tends to increase, whereby the capacitance and the capacity of the cell can be increased. The positive electrode active material weight is preferably larger than the negative electrode active material weight, and it is more preferably from 1.1 times to 10 times. If it is less than 1.1 times, the difference in capacity with an electric double layer capacitor tends to be small, and if it exceeds 10 times, the capacity may be small on the contrary in some cases, and the difference in thickness between the positive electrode and the negative electrode will be too significant, and such is unfavorable in view of the cell structure.

In the present invention, the capacitance and the capacity of the capacitor cell (hereinafter sometimes referred to simply as a cell) are defined as follows. The capacitance of a cell represents the electrical quantity applied to the cell per unit voltage of the cell (slope of the discharge curve) and its unit is F (farad). The capacitance per unit weight of a cell is a value obtained by dividing the capacitance of the cell by a total weight of the positive electrode active material and the negative electrode active material in the cell and its unit is F/g. The capacitance of a positive electrode or a negative electrode represents the electrical quantity applied to the cell per unit voltage of the positive electrode or the negative electrode (slope of the discharge curve) and its unit is F. The capacitance per unit weight of a positive electrode or a negative electrode represents a value obtained by dividing the capacitance of the positive electrode or the negative electrode by the weight of the positive electrode or the negative electrode active material in the cell and its unit is F/g.

Further, the cell capacity is a product of the capacitance of a cell and a difference between the discharge starting voltage and the discharge completion voltage of a cell i.e. a change in voltage, and its unit is C (coulomb). 1 C is charge quantity when 1 A current is applied in one second, and thus the unit is calculated as mAh in the present invention. The positive electrode capacity is a product of the capacitance of the positive electrode and a difference (a change in positive electrode potential) between the positive electrode potential when discharge starts and the positive electrode potential when discharge is completed, and its unit is C or mAh. Similarly, the negative electrode capacity is a product of the capacitance of the negative electrode and a difference (change in negative electrode potential) between the negative electrode potential when discharge starts and the negative electrode potential when discharge is completed, and its unit is C or mAh. The cell capacity agrees with the positive electrode capacity and the negative electrode capacity.

A means of preliminarily doping the negative electrode and/or the positive electrode with lithium ions for the lithium ion capacitor of the present invention is not particularly limited. For example, a lithium ion supply source capable of supplying lithium ions, such as metal lithium may be disposed in a capacitor cell as a lithium electrode. As the amount of the lithium ion supply source (the weight of e.g. lithium metal), an amount with which a predetermined capacity of the negative electrode will be obtained is sufficient. In such a case, the negative electrode and the lithium electrode may be brought into physical contact (short circuit), or electrochemical doping may be employed. The lithium ion supply source may be formed on a lithium electrode current collector comprising an electrically conductive porous body. As the electrically conductive porous body to be the lithium electrode current collector may be a metal porous body which will not react with the lithium ion supply source, such as a stainless steel mesh.

In a large capacity multi-layer structure capacitor cell, a positive electrode current collector and a negative electrode current collector each for receiving and supplying electricity are provided for the positive electrode and the negative electrode, respectively. In the case of a cell employing the positive electrode current collector and the negative electrode current collector and having a lithium electrode provided, it is preferred that the lithium electrode is disposed so as to face the negative electrode current collector so that it can electrochemically supply lithium ions to the negative electrode. In such a case, as the positive electrode current collector and the negative electrode current collector, a material having pores penetrating from the front surface to the back surface, such as an expanded metal is used, and the lithium electrode is disposed to face the negative electrode and/or the positive electrode. The shape, number, etc. of the through pores are not particularly limited and may suitably be set so that lithium ions in an electrolytic solution as described hereinafter can move from the front surface to the back surface of the electrode without being blocked by the electrode current collector.

In the lithium ion capacitor of the present invention, doping with lithium ions can be uniformly carried out also in a case where the lithium electrode for doping the negative electrode and/or the positive electrode is locally disposed in the cell. Accordingly, even in the case of a large capacity cell having the positive electrode and the negative electrode laminated or wound, the negative electrode can be smoothly and uniformly doped with lithium ions by disposing the lithium electrode at a part of the outermost portion of the cell.

As the material of the electrode current collector, various materials proposed for use in a lithium battery can be usually used. For the positive electrode current collector, aluminum, stainless steel, etc. can be used, and for the negative electrode current collector, stainless steel, copper, nickel, etc. can be suitably used. Further, in the case of doping by electrochemical contact with the lithium ion supply source disposed in the cell, lithium means a substance containing at least lithium and capable of supplying lithium ions, such as lithium metal or a lithium/aluminum alloy.

The aprotic organic solvent electrolyte solution to be used in the lithium ion capacitor of the present invention contains vinylene carbonate or its derivative. The derivative of vinylene carbonate may, for example, be methylvinylene carbonate, dimethylvinylene carbonate, phenylvinylene carbonate, diphenylvinylene carbonate, vinylethylene carbonate or divinylethylene carbonate. Among them, vinylene carbonate is particularly preferred from such reasons that a more stable and higher quality coating film can be formed on the surface of the negative electrode.

The content of vinylene carbonate or its derivative in the electrolytic solution has to be preferably at most 5 wt %. If the content is higher than 5 wt %, vinylene carbonate will be present excessively in the electrolytic solution, which may impair cell characteristics such as durability in some cases. Further, if the content is low, its effect expected in the present invention tends to be small, and accordingly it is preferably at least 0.01 wt %, particularly preferably from 0.1 to 3 wt %.

The aprotic organic solvent to form the aprotic organic solvent electrolyte solution in the present invention is preferably a cyclic aprotic solvent and/or a chain aprotic solvent. The cyclic aprotic solvent may be a cyclic carbonate such as ethylene carbonate, a cyclic ester such as γ-butyrolactone, a cyclic sulfone such as sulfolane or a cyclic ether such as dioxolane. The chain aprotic solvent may be a chain carbonate such as dimethyl carbonate, a chain carboxylate such as methyl propionate or a chain ether such as dimethoxyethane. These aprotic organic solvents may be a mixture of two or more of them.

The aprotic solvent is preferably a mixture of the above cyclic aprotic solvent with the chain aprotic solvent in view of characteristics of the capacitor, and particularly preferably a mixture of a cyclic carbonate with a chain carbonate. The cyclic carbonate may, for example, be ethylene carbonate, propylene carbonate or butylene carbonate. The chain carbonate may, for example, be dimethyl carbonate, methyl ethyl carbonate, diethyl carbonate or methyl propyl carbonate.

Specifically, a preferred combination for the solvent mixture of a cyclic carbonate with a chain carbonate may, for example, be ethylene carbonate and dimethyl carbonate, ethylene carbonate and diethyl carbonate, ethylene carbonate and ethyl methyl carbonate, ethylene carbonate, dimethyl carbonate and diethyl carbonate, ethylene carbonate, diethyl carbonate and methyl ethyl carbonate, ethylene carbonate, dimethyl carbonate and propylene carbonate, ethylene carbonate, methyl ethyl carbonate and propylene carbonate, or ethylene carbonate, diethyl carbonate and propylene carbonate, and particularly preferred is a combination of ethylene carbonate, diethyl carbonate and propylene carbonate. By such a combination, it is possible to suppress an increase in viscosity of the electrolytic solution, to increase the degree of dissociation of the electrolytic solution and to increase the conductivity.

The mixture ratio in the solvent mixture of a cyclic carbonate with a chain carbonate is suitably such that the cyclic carbonate:chain carbonate is preferably from 1:99 to 80:20, more preferably from 10:90 to 60:40.

As an electrolyte to be dissolved in the above aprotic solvent as a single solvent or a mixture, any lithium salt may be used so long as it is an electrolyte capable of forming lithium ions. Such a lithium salt may, for example, be preferably $LiClO_4$, $LiAsF_6$, $LiBF_4$, $LiPF_6$, $LiN(C_2F_5SO_2)_2$ or $LiN(CF_3SO_2)_2$. Particularly $LiPF_6$ is suitable, which has a high ionic conductivity and has a low resistance. The above electrolyte and solvent are mixed in a sufficiently dehydrated state to obtain an electrolyte solution. The concentration of the electrolyte in the electrolytic solution is preferably at least 0.1 mol/l so as to reduce the internal resistance contributed from the electrolytic solution, more preferably within a range of from 0.5 to 1.5 mol/l.

The positive electrode active material in the lithium ion capacitor of the present invention comprises a material capable of reversively supporting lithium ions and anions such as tetrafluoroborate. Such a positive electrode active material may be formed by known activated carbon particles. The grain size of the activated carbon can be selected from wide ranges which are generally employed. For example, the 50% volume cumulative diameter (also called D50) is at least 2 μm, preferably from 2 to 50 μm, particularly preferably from 2 to 20 μm. Further, the average pore size is preferably at most 10 nm, and the specific surface area is preferably from 600 to 3,000 $m^2/g$, particularly preferably from 1,300 to 2,500 $m^2/g$.

The positive electrode in the present invention is formed from the above activated carbon powder by means of a known method. Namely, the activated carbon powder, a binder and if necessary, an electrically conductive agent and a thickener (such as CMC) are dispersed in an aqueous or organic solvent to obtain a slurry, and the slurry is applied on a current collector to be used if necessary, or the slurry is preliminarily formed into a sheet, which is bonded on the current collector. The binder to be used may, for example, be a rubber type binder such as SBR, a fluororesin such as polytetrafluoroethylene or polyvinylidene fluoride, a thermoplastic resin such as a polypropylene or a polyethylene, or an acrylic resin.

Further, the electrically conductive agent to be used if necessary may, for example, be acetylene black, graphite or a metal powder. The amount of the electrically conductive agent to be used varies depending upon the electrical conductivity of the negative electrode active material, the electrode shape, etc., but a proportion of from 2 to 40 wt % based on the negative electrode active material is suitable.

On the other hand, the negative electrode active material in the present invention is formed from a material capable of reversively supporting lithium ions. A preferred material may, for example, be a carbon material such as graphite, hard carbon or coke, or a polyacenic material (hereinafter sometimes referred to as PAS). PAS may be one obtained by carbonizing e.g. a phenol resin, activating it if necessary and pulverizing it. The carbonization is carried out by putting the phenol resin or the like in a heating furnace and heating it at a temperature at which it is carbonized for a predetermined time, in the same manner as in the case of the activated carbon for the positive electrode. The temperature varies depending upon e.g. the heating time, and it is usually from 400 to 800° C. in the case of PAS. The pulverization is carried out by means of a known pulverizer such as a ball mill.

As the negative electrode active material in the present invention, PAS is particularly preferred with a view to obtaining a large capacity. A capacitance of at least 650 F/g will be obtained when lithium ions in an amount of 400 mAh/g are supported (charged) by PAS, and a capacitance of at least 750 F/g will be obtained when lithium ions in an amount of at least 500 mAh/g are charged. PAS has an amorphous structure, and the larger the amount of lithium ions to be supported, the lower the potential. Thus, the withstand voltage (charge voltage) of the capacitor to be obtained tends to increase, and the voltage-increasing rate (the slope of the discharge curve) in discharge tends to be low, whereby the capacity will slightly increase. Therefore, it is desirable to set the amount of lithium ions within the lithium ion absorbing power of the active material depending upon the desired working voltage of the capacitor.

Further, PAS, which has an amorphous structure, is free from structural changes such as swelling and contraction upon insertion and release of lithium ions and is thereby excellent in cyclic characteristics. Further, it has an isotropic molecular structure (a higher-order structure) for insertion and release of lithium ions and is thereby excellent in quick charge and quick discharge, and accordingly it is suitable. An aromatic condensed polymer which is a precursor of PAS is a condensed product of an aromatic hydrocarbon compound with an aldehyde. The aromatic hydrocarbon compound may be suitably a so-called phenol such as phenol, cresol or xylenol. Specifically, it may be a methylene-bisphenol represented by the following formula:

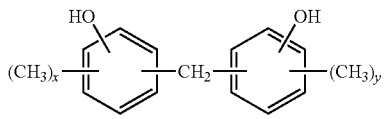

wherein each of x and y which are independent of each other, is 0, 1 or 2, or a hydroxy-bisphenyl or a hydroxynaphthalene. Among them, a phenol is suitable.

Further, the aromatic condensed polymer may also be a modified aromatic condensed polymer having part of the above aromatic hydrocarbon compound having a phenolic hydroxyl group substituted by an aromatic hydrocarbon compound having no phenolic hydroxyl group such as xylene, toluene or aniline, for example, a condensed product of phenol, xylene and formaldehyde. Further, a modified aromatic polymer substituted by melamine or urea may also be used, and a furan resin is also suitable.

In the present invention, PAS is produced as follows. Namely, the above aromatic condensed polymer is gradually heated to an appropriate temperature of from 400 to 800° C. in a non-oxidizing atmosphere (including vacuum) to obtain an insoluble and infusible substrate having an atomic ratio of hydrogen atoms/carbon atoms (hereinafter referred to as H/C) of from 0.5 to 0.05, preferably from 0.35 to 0.10. This insoluble and infusible substrate is gradually heated to an appropriate temperature of from 350 to 800° C., preferably from 400 to 750° C. in a non-oxidizing atmosphere (including vacuum) to obtain an insoluble and infusible substrate having the above H/C.

With respect to the above insoluble and infusible substrate, in X-ray diffraction (CuKα), the main peak is present at the position of at most 24° as represented by 2 θ, and another broad peak is present at a position of from 41 to 46° in addition to the above main peak. Namely, the insoluble and infusible substrate has a polyacenic skeleton structure having an aromatic polycyclic structure appropriately developed, has an amorphous structure, and is capable of being stably doped with lithium ions.

As the grain size characteristics of the negative electrode active material in the present invention, the negative electrode active material is formed from negative electrode active material particles having a 50% volume cumulative diameter (also called D50) of from 0.5 to 30 μm, preferably from 0.5 to 15 μm, particularly preferably from 0.5 to 6 μm. Further, the negative electrode active material particles of the present invention have a specific surface area preferably between 0.1 and 2,000 m²/g, more preferably between 0.1 and 1,000 m²/g, particularly preferably between 0.1 and 600 m²/g.

The negative electrode in the present invention is formed from the above negative electrode active material powder, by means of a known method in the same manner as in the case of the positive electrode. Namely, the negative electrode active material powder, a binder and if necessary, an electrically conductive agent and a thickener (such as CMC) are dispersed in an aqueous or organic solvent to obtain a slurry, and the slurry is applied on the above current collector, or the slurry is preliminarily formed into a sheet, which is bonded on the current collector. The binder to be used may, for example, be a rubber type binder such as SBR, a fluororesin such as polytetrafluoroethylene or polyvinylidene fluoride, a thermoplastic resin such as a polypropylene or a polyethylene, or an acrylic resin. The amount of the binder to be used varies depending upon the electrical conductivity of the negative electrode active material, the electrode shape, etc., but a proportion between 2 and 40 wt % based on the negative electrode active material is suitable.

The lithium ion capacitor of the present invention is particularly suitable for a large capacity cell such as a wound type cell comprising strip positive electrode and negative electrode wound with a separator interposed therebetween, a laminate type cell comprising at least three plate-like positive electrodes and at least three plate-like negative electrodes laminated with a separator interposed therebetween, or a film type cell having a laminate comprising at least three plate-like positive electrodes and at least three plate-like negative electrodes laminated with a separator interposed therebetween, sealed in an outer film. Structures of such cells have been already known from e.g. WO00/07255, WO03/003395 and JP-A-2004-266091. The capacitor cell of the present invention may have the same structures as those of known cells.

EXAMPLES

Now, the present invention will be explained in detail with reference to Examples. However, the present invention is by no means restricted to such Examples. Process for Producing Negative Electrode A phenol resin molded plate having a thickness of 0.5 mm was put in a Siliconit electric furnace and subjected to a heat treatment by increasing the temperature at a rate of 50° C./hour to 550° C. and further at a rate of 10° C./hour to 670° C. in a nitrogen atmosphere thereby to synthesize PAS. The PAS plate thus obtained was pulverized with a ball mill to obtain a PAS powder having an average particle size of 4 μm. The PAS powder had a H/C ratio of 0.2.

Then, 92 parts by weight of the above PAS powder, 6 parts by weight of an acetylene black powder, 5 parts by weight of an acrylic resin binder, 3 parts by weight of carboxymethyl cellulose and 200 parts by weight of water were sufficiently mixed to obtain a slurry.

The slurry for a negative electrode was applied on both sides of copper expanded metal (manufactured by Nippon Metal Industry Co., Ltd.) having a thickness of 32 μm (porosity 57%) as a negative electrode current collector by a roll coater, followed by vacuum drying to obtain a negative electrode having an entire thickness (the total of the thickness of the negative electrode layers on both sides, the thickness of the electrically conductive layers on both sides and the thickness of the negative electrode current collector) of 89 μm. Process for Producing Positive Electrode 92 Parts by weight of a commercial activated carbon powder having a specific surface area of 2,000 m²/g, 6 parts by weight of an acetylene black powder, 7 parts by weight of an acrylic resin binder, 4 parts by weight of carboxymethyl cellulose and 200 parts by weight of water were sufficiently mixed to obtain a slurry.

A non-aqueous carbon type electrically conductive coating was applied on both sides of aluminum expanded metal (manufactured by Nippon Metal Industry Co., Ltd.) having a thickness of 38 μm (porosity 47%) by a roll coater and dried to obtain a current collector for a positive electrode having electrically conductive layers formed thereon. The entire thickness (the total of the current collector thickness and the electrically conductive layer thickness) was 52 μm, and through pores were substantially clogged with the electrically conductive coating. The above slurry for a positive electrode was applied on both sides of the positive electrode current collector by a roll coater, followed by vacuum drying to obtain a positive electrode having an entire thickness (the total of the thickness of the positive electrode layers on both sides, the thickness of the electrically conductive layers on both sides and the thickness of the positive electrode current collector) of 173 μm.

Measurement of Capacitance Per Unit Weight of Negative Electrode

The negative electrode was cut into a negative electrode for evaluation having a size of 1.5×2.0 cm². The negative electrode and lithium metal having a size of 1.5×2.0 cm² and a thickness of 200 μm as an opposite electrode were overlaid with a polyethylene nonwoven fabric having a thickness of 50 μm as a separator interposed therebetween to assemble a mimic cell. Lithium metal was used as a reference electrode. As an electrolytic solution, a solution having $LiPF_6$ dissolved at a concentration of 1 mol/l in propylene carbonate was used. Lithium ions were charged in an amount of 600 mAh/g based on the negative electrode active material weight at a charge current of 1 mA, and then discharge to 1.5 V was carried out at 1 mA. The capacitance per unit weight of the negative electrode was obtained from the discharge time over which the potential of the negative electrode changed by 0.2 V from the potential which one minute went on after initiation of the discharge, and found to be 912 F/g.

Measurement of Capacitance Per Unit Weight of Positive Electrode

The above positive electrode was cut into a positive electrode for evaluation having a size of 1.5×2.0 cm². The positive electrode and lithium metal having a size of 1.5×2.0 cm² and a thickness of 200 μm as an opposite electrode were overlaid with a polyethylene nonwoven fabric having a thickness of 50 μm as a separator interposed therebetween to assemble a mimic cell. Lithium metal was used as a reference electrode. As an electrolytic solution, a solution having $LiPF_6$ dissolved at a concentration of 1 mol/l in propylene carbonate was used. Charge to 3.6 V at a charge current of 1 mA was carried out and then constant voltage charge was carried out, and after a total charge time of 1 hour, discharge was carried out to 2.5 V at 1 mA. The capacitance per unit weight of the positive electrode was obtained from the discharge time from 3.5 V to 2.5 V and found to be 140 F/g.

Process for Preparing Film Type Capacitor Cell

The positive electrode was cut into five pieces having a size of 2.4 cm×3.8 cm, the negative electrode was cut into six pieces having a size of 2.4 cm×3.8 cm, and they were laminated with a separator interposed therebetween as shown in FIG. 1, followed by drying at 150° C. for 12 hours, and a separator was disposed on each of the uppermost and lowermost portions, and four sides of the laminate were fixed with a tape to obtain an electrode laminate unit. As lithium metal in an amount corresponding to 600 mAh/g based on the weight of the negative electrode active material, one having a lithium metal foil having a thickness of 70 μm contact bonded on copper expanded metal having a thickness of 23 μm was used, and one sheet was disposed on the outermost portion of the electrode laminate unit to face the negative electrode. The negative electrodes (six sheets) and the stainless steel net having lithium metal contact bonded thereon were welded and contacted to obtain an electrode laminate unit. On terminal welding portions (five sheets) of the positive electrode current collectors of the above electrode laminate unit, an aluminum positive electrode terminal having a width of 3 mm, a length of 50 mm and a thickness of 0.1 mm, having a sealant film preliminarily heat sealed on a sealing area, and was overlaid and welded by ultrasonic welding. Likewise, on terminal welding portions (six sheets) of the negative electrode current collectors, a nickel negative electrode terminal having a width of 3 mm, a length of 50 mm and a thickness of 0.1 mm, having a sealant film preliminarily heat sealed on a sealing area, was overlaid and welded by ultrasonic welding, and the laminate was disposed between one outer film deep-drawn to a size of 60 mm×30 mm and 3 mm in depth and one outer film not deep-drawn.

Two sides at the terminal portions and other one side of the outer laminate films were heat sealed, followed by vacuum impregnation with an electrolytic solution, and then the other one side was heat sealed under reduced pressure and vacuum-sealed to assemble a film type capacitor cell.

In Example 1, as the electrolytic solution, a solution having vinylene carbonate added in an amount of 1 wt % to a solution having $LiPF_6$ dissolved at a concentration of 1.2 mol/l in a solvent mixture of ethylene carbonate, diethyl carbonate and propylene carbonate in a weight ratio of 3:4:1, was used, and three cells were prepared.

In Example 2, as the electrolytic solution, a solution having vinylene carbonate added in an amount of 3 wt % to a solution having $LiPF_6$ dissolved at a concentration of 1.2 mol/l in a solvent mixture of ethylene carbonate, diethyl carbonate and propylene carbonate in a weight ratio of 3:4:1, was used, and three cells were prepared.

In Example 3, as the electrolytic solution, a solution having vinylene carbonate added in an amount of 0.1 wt % to a solution having $LiPF_6$ dissolved at a concentration of 1.2 mol/l in a solvent mixture of ethylene carbonate, diethyl carbonate and propylene carbonate in a weight ratio of 3:4:1, was used, and three cells were prepared.

In Example 4, as the electrolytic solution, a solution having vinylene carbonate added in an amount of 0.5 wt % to a solution having $LiPF_6$ dissolved at a concentration of 1.2 mol/l in a solvent mixture of ethylene carbonate, diethyl carbonate and propylene carbonate in a weight ratio of 3:4:1, was used, and three cells were prepared.

In Example 5, as the electrolytic solution, a solution having vinylene carbonate added in an amount of 1 wt % to a solution having $LiPF_6$ dissolved at a concentration of 1.2 mol/l in a solvent mixture of ethylene carbonate and methyl ethyl carbonate in a weight ratio of 2:3, was used, and three cells were prepared.

In Example 6, as the electrolytic solution, a solution having vinylene carbonate added in an amount of 1 wt % to a solution having $LiN(C_2F_5SO_2)_2$ dissolved at a concentration of 1.2 mol/l in a solvent mixture of ethylene carbonate, diethyl carbonate and propylene carbonate in a weight ratio of 3:4:1, was used, and three cells were prepared.

In Comparative Example 1, as the electrolytic solution, a solution having $LiPF_6$ dissolved at a concentration of 1.2 mol/l in a solvent mixture of ethylene carbonate, diethyl carbonate and propylene carbonate in a weight ratio of 3:4:1, was used, and three cells were prepared.

In Comparative Example 2, as the electrolytic solution, a solution having $LiPF_6$ dissolved at a concentration of 1.2 mol/l in a solvent mixture of ethylene carbonate and methyl ethyl carbonate in a weight ratio of 2:3, was used, and three cells were prepared.

In Comparative Example 3, as the electrolytic solution, a solution having $LiN(C_2F_5SO_2)_2$ dissolved at a concentration of 1.2 mol/l in a solvent mixture of ethylene carbonate, diethyl carbonate and propylene carbonate in a weight ratio of 3:4:1, was used, and three cells were prepared.

Cell Characteristic Evaluation

14 Days after the cells were left to stand after assembled, one cell was decomposed in each Example, whereupon the lithium metal completely disappeared. Accordingly, it was judged that the negative electrodes were preliminarily charged with lithium ions so as to obtain a capacitance of 912 F/g per unit weight of the negative electrode active material.

Then, using one cell in each Example, the positive electrodes and the negative electrodes were short-circuited to measure the positive electrode potential, whereupon the positive electrode potential in each Example was within a range of from 0.85 to 0.95 V, which was at most 2.0 V.

The other cell of the film type capacitor in each Example was charged at a constant current of 200 mA until the cell voltage became 3.8 V, and then a constant current/constant voltage charge of applying a constant voltage of 3.8 V was carried out for 30 minutes. Then, discharge at a constant current of 200 mA was carried out until the cell voltage became 2.2 V. The initial capacitance and the energy density were calculated from the cell capacity, the discharge starting voltage, the discharge completion voltage and the average voltage after the cycle of from 3.8 V to 2.2 V.

Then, a voltage of 3.6 V was applied in a thermostatic chamber of 60° C., and after a certain time, the application of a voltage was terminated, the cell was taken out from the thermostatic chamber and left to stand at 25° C. for 3 hours, and the above cycle of from 3.8 V to 2.2 V was carried out to calculate the capacitance, and such a measurement was repeatedly carried out (voltage application test). The capacitance was calculated after a lapse of 60 hours, 173 hours, 333 hours and 1,010 hours after the application of a voltage, thereby to obtain a retention relative to the initial capacitance.

Capacitance retention=capacitance after a lapse of predetermined time/initial capacitance×100

In the following Tables 1 and 2, VC represents vinylene carbonate, EC ethylene carbonate, DEC diethyl carbonate, PC propylene carbonate and MEC methyl ethyl carbonate.

TABLE 1

Initial capacitance and energy density

| | Solvent | Solute | VC content (wt %) | Initial capacitance (F) | Energy density (Wh/l) |
|---|---|---|---|---|---|
| Ex. 1 | 3EC + 4DEC + PC | $LiPF_6$ | 1 | 29.7 | 12.1 |
| Ex. 2 | 3EC + 4DEC + PC | $LiPF_6$ | 3 | 29.3 | 11.9 |
| Ex. 3 | 3EC + 4DEC + PC | $LiPF_6$ | 0.1 | 31.5 | 12.6 |
| Ex. 4 | 3EC + 4DEC + PC | $LiPF_6$ | 0.5 | 29.6 | 12.0 |
| Ex. 5 | 2EC + 3MEC | $LiPF_6$ | 1 | 29.9 | 12.1 |
| Ex. 6 | 3EC + 4DEC + PC | $LiN(C_2F_5SO_2)_2$ | 1 | 28.3 | 11.4 |
| Comp. Ex. 1 | 3EC + 4DEC + PC | $LiPF_6$ | — | 30.6 | 12.3 |
| Comp. Ex. 2 | 2EC + 3MEC | $LiPF_6$ | — | 30.8 | 12.4 |
| Comp. Ex. 3 | 3EC + 4DEC + PC | $LiN(C_2F_5SO_2)_2$ | — | 29.2 | 11.8 |

TABLE 2

Capacity retention after a lapse of 1,010 hours after voltage application

| | Solvent | Solute | VC content (wt %) | Capacity retention |
|---|---|---|---|---|
| Ex. 1 | 3EC + 4DEC + PC | $LiPF_6$ | 1 | 95.9% |
| Ex. 2 | 3EC + 4DEC + PC | $LiPF_6$ | 3 | 94.3% |
| Ex. 3 | 3EC + 4DEC + PC | $LiPF_6$ | 0.1 | 93.3% |
| Ex. 4 | 3EC + 4DEC + PC | $LiPF_6$ | 0.5 | 95.1% |
| Ex. 5 | 2EC + 3MEC | $LiPF_6$ | 1 | 93.5% |
| Ex. 6 | 3EC + 4DEC + PC | $LiN(C_2F_5SO_2)_2$ | 1 | 93.3% |
| Comp. Ex. 1 | 3EC + 4DEC + PC | $LiPF_6$ | — | 91.9% |
| Comp. Ex. 2 | 2EC + 3MEC | $LiPF_6$ | — | 89.6% |
| Comp. Ex. 3 | 3EC + 4DEC + PC | $LiN(C_2F_5SO_2)_2$ | — | 89.4% |

In a case where ethylene carbonate, diethyl carbonate and propylene carbonate were used as the solvents and $LiPF_6$ was used as the solute, the capacity retention after a lapse of 1,010 hours after voltage application at 60° C. was high and durability improved in Example 1 wherein 1 wt % of vinylene carbonate was contained, Example 2 wherein 3 wt % of vinylene carbonate was contained, Example 3 wherein 0.1 wt % of vinylene carbonate was contained and Example 4 wherein 0.5 wt % of vinylene carbonate was contained as compared with Comparative Example 1 wherein no vinylene carbonate was contained.

In a case where ethylene carbonate and methyl ethyl carbonate were used as the solvents and $LiPF_6$ was used as the solute, the capacity retention after a lapse of 1,010 hours after voltage application at 60° C. was high and durability improved in Example 5 wherein 1 wt % of vinylene carbonate was contained as compared with Comparative Example 2 wherein no vinylene carbonate was contained. However, since the capacity retention was low in Example 5 as com- The cell in which doping with lithium ions was preliminarily carried out, had an equally high energy density either in a case where vinylene carbonate was incorporated in an amount of at most 5 wt % in the electrolytic solution (Examples 1 to 6) and in a case where no vinylene carbonate was incorporated in the electrolytic solution (Comparative Examples 1, 2 and 3).

pared with in Example 1, preferred as the solvent is a mixture of ethylene carbonate, diethyl carbonate and propylene carbonate.

Also in a case where ethylene carbonate, diethyl carbonate and propylene carbonate were used as the solvents and $LiN(C_2F_5SO_2)_2$ was used as the solute, the capacity retention after a lapse of 1,010 hours after voltage application at 60° C.

was high and durability improved in Example 6 wherein 1 wt % of vinylene carbonate was used as compared with Comparative Example 3 wherein no vinylene carbonate was contained.

INDUSTRIAL APPLICABILITY

The lithium ion capacitor of the present invention is very useful as a driving or auxiliary electrical storage source for electric automobiles, hybrid electric automobiles, etc. Further, it is suitable as a driving storage source for electric automobiles, motorized wheelchairs, etc., an electrical storage device for various energy generation such as solar energy generation or wind power generation, or an electrical storage source for domestic electrical equipment.

The invention claimed is:

1. A lithium ion capacitor comprising a positive electrode, a negative electrode and an aprotic organic solvent electrolyte solution of a lithium salt as an electrolytic solution, characterized in that a positive electrode active material is a material capable of reversibly supporting lithium ions and/or anions, a negative electrode active material is a material capable of reversibly supporting lithium ions, the negative electrode and/or the positive electrode are doped with lithium ions so that the potential of the positive electrode is at most 2.0 V after the positive electrode and the negative electrode are short-circuited, and the electrolytic solution contains vinylene carbonate or its derivative.

2. The lithium ion capacitor according to claim 1, wherein the positive electrode and/or the negative electrode have a current collector having pores penetrating from the front surface to the back surface, and are doped with lithium ions by electrochemical contact of the negative electrode with a lithium ion supply source.

3. The lithium ion capacitor according to claim 1, wherein the negative electrode active material has a capacitance per unit weight at least three times that of the positive electrode active material, and the weight of the positive electrode active material is larger than the weight of the negative electrode active material.

4. The lithium ion capacitor according to claim 1, wherein the electrolytic solution contains vinylene carbonate or its derivative in an amount of at most 5 wt %.

5. The lithium ion capacitor according to claim 1, wherein the aprotic organic solvent is a mixture of a cyclic carbonate with a chain carbonate.

6. The lithium ion capacitor according to claim 1, wherein the aprotic organic solvent is a mixture of ethylene carbonate, propylene carbonate and diethyl carbonate.

7. The lithium ion capacitor according to claim 1, wherein the lithium salt is $LiPF_6$, $LiN(C_2F_5SO_2)_2$ or $LiN(CF_3SO_2)_2$.

8. The lithium ion capacitor according to claim 1, wherein the electrolytic solution contains vinylene carbonate.

9. The lithium ion capacitor according to claim 1, wherein the electrolytic solution comprises from 0.1-3 wt.% of vinylene carbonate.

10. The lithium ion capacitor according to claim 9, wherein the electrolytic solution contains at least one solute selected from the group consisting of $LiPF_6$ and $LiN(C_2F_5SO_2)_2$.

11. The lithium ion capacitor according to claim 9, wherein the electrolytic solution further comprising one or more selected from the group consisting of ethylene carbonate, diethyl carbonate, propylene carbonate and methylethyl carbonate.

12. The lithium ion capacitor according to claim 1, having a capacity retention of 93.3-94.9% after a lapse of 1,010 hours of voltage application.

13. The lithium ion capacitor according to claim 1, wherein the potential of the positive electrode is at most 1.5 V after the positive electrode and the negative electrode are short-circuited.

14. The lithium ion capacitor according to claim 1, wherein the potential of the positive electrode is at most 1.0 V after the positive electrode and the negative electrode are short-circuited.

15. The lithium ion capacitor according to claim 1, wherein the potential of the positive electrode is from 1.0-2.0 V after the positive electrode and the negative electrode are short-circuited.

* * * * *